United States Patent Office 3,544,648
Patented Dec. 1, 1970

3,544,648
CONVERSION OF OLEFINS
Reagan T. Wilson, Bartlesville, Okla., assignor to Phillips Petroleum Company, a corporation of Delaware
No Drawing. Filed Apr. 3, 1967, Ser. No. 627,631
Int. Cl. C07c 5/62
U.S. Cl. 260—683         8 Claims

ABSTRACT OF THE DISCLOSURE

In the conversion of an olefin into other olefins having different numbers of carbon atoms by contact with a catalyst active for disproportionating propylene into ethylene and butene wherein the catalyst has an initial activity which is quite high, the activity is controlled by adding a small amount of water with the feed olefin.

---

This invention relates to the olefin reaction of olefin hydrocarbons to produce other hydrocarbons. In one aspect it relates to an improved process for the olefin reaction wherein the amount of product is maintained substantially constant. In another aspect it relates to a process for the olefin reaction wherein the conversion is controlled at a predetermined level.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2-yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclohexadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

In the olefin reaction to convert olefin hydrocarbons into other olefin hydrocarbons in the presence of an olefin reaction catalyst such as a tungsten oxide-silica catalyst, the initial activity of the catalyst, following the induction period, is often quite high. The new, or freshly regenerated, tungsten oxide-silica catalyst passes through an induction period, when first put on stream, during which a relatively high temperature, 835 to 850° F., is required to obtain satisfactory conversion. Immediately following the induction period, the initial activity of the catalyst is exceedingly high and it is sometimes difficult to reduce the temperature rapidly enough to avoid a "run away" reaction. It is desirable to operate the reaction at a temperature as close to that of the regeneration step as possible to avoid costly and time-consuming heating and cooling steps. It is also desirable to operate the reaction at a constant or substantially constant conversion level so as to provide a constant or substantially constant feed stream, both in quantity and in composition, to the distillation facilities down stream from the reactors.

It is, therefore, an object of this invention to provide a process for the olefin reaction wherein the activity of the catalyst is controlled. It is also an object of this invention to provide a process for the olefin reaction wherein the amount of products resulting from the reaction is maintained substantially constant. A further object of this invention is the provision of a method for controlling the activity of a tungsten oxide-silica catalyst in the olefin reaction process. Other aspects, objects and advantages of this invention will be apparent to those skilled in the art upon studying this disclosure including the detailed description of the invention.

According to the process of the present invention, the initial high activity of a catalyst such as a tungsten oxide-silica catalyst in the olefin reaction process, following the induction period, can be controlled by the addition of a small amount of water or air to the feed to the process. I have found that the effect of the addition of water or air on the catalyst and/or the reaction is terminated when the addition of water or air is terminated. Termination of the addition of water or air returns the activity of the catalyst to about the point in time which would have been obtained with a dry system. This control of catalyst activity can be obtained with a regenerated catalyst as well as with a fresh or new catalyst. This effect can also be obtained on a catalyst which has previously been steam treated. When air is used, it is believed that the oxygen of the air reacts with hydrocarbons to form water so that water controls the activity of the catalyst whether air or water is added to the reaction.

The silica component of the tungsten oxide-silica catalyst utilized in the present invention can be any conventional catalyst grade silica. Some examples are precipitated silica gel, microspheroidal silica, flame hydrolyzed silica and silica aerogels. These materials have appreciable surface area, usually in the range of 50 to 700 m.$^2$/g., and can range from fine powders to coarse granules. These materials often contain small amounts of compounds of aluminum and sodium, in the order of a few tenths percent by weight and smaller. Trace amounts of these and other metals are often present and such small amounts of these materials are not objectionable. The alumina content should be below about 1 percent by weight, preferably about ½ percent, although higher concentrations of alumina can sometimes be tolerated. The silica can contain other materials including magnesium oxide in amounts which do not change the essential characteristics of the olefin reconstruction reaction.

The catalyst utilized in the present invention can be prepared by any conventional method. A common method for preparing the tungsten oxide-silica catalyst comprises impregnating the silica with a tungsten compound convertible to the oxide, for example, ammonium tungstate, by wetting the silica with an aqueous solution of ammonium tungstate, evaporating the water and activating the composite catalyst by heating same in a stream of dry air at a tempertaure of about 1000° F. for a period of one-half hour or longer. The ammonium tungstate is considered to be converted to the oxide during this activation treatment.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3-30 carbon atoms per molecule and with such cyclic olefins having 4-30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9-octadecapentene, 1,3 - eicosadiene, 4- octene, 3 -eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclonone, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

The operating temperature for the olefin reaction process of this invention is in the range of about 400 to 1100° F. When using the tungsten oxide-silica catalyst for the disproportionation of propylene, the preferred operating temperature will be in the range of about 600 to 900° F. Selecting an operating temperature in the higher portions of the selected temperature range makes the catalyst bed less susceptible to poisoning and promotes more rapid recovery from a temporary reduction in activity. In many instances, an operating temperature at or near regeneration temperature can be selected, thus reducing or eliminating costly or time-consuming cooling and heating cycles. For higher molecular weight olefins, the preferred temperatures will be somewhat lower.

Generally, the olefin reaction is essentially independent of pressure, except as pressure affects the density of the feed and thus the contact time. Furthermore, an increase in operating pressure usually results in lower operating temperature at constant conversion level. Pressures in the range of 0 to 1500 p.s.i.g. and higher are suitable. However, particularly with higher olefins, especially olefins having at least 5 carbon atoms per molecule, operating at pressures in the lower portion of the range, e.g., below about 100 p.s.i.g., reduces the tendency to form products more highly branched than the starting material.

The operable range of contact time for the olefin reaction process depends primarily upon the operating temperatures and the activity of the catalyst. In general, undesired reactions are favored by longer contact times; therefore, the contact time should be maintained as short as possible, consistent with desired olefin conversion.

In general, contact times in the range of 0.1 to 60 seconds can be used and contact times in the range of 1 to 60 seconds are suitable in many instances. With a fixed bed reactor and continuous flow operation, weight hourly space velocities in the range of 0.5 to 1000 parts by weight of hydrocarbon feed per part by weight of catalyst per hour are suitable, with excellent results having been obtained in the range of 1 to 200.

The olefin reaction can be carried out either in the presence or absence of a diluent. Paraffinic and cycloparaffinic hydrocarbons will often be employed. Suitable diluents include propane, cyclohexane, methylcyclohexane, n-pentane, n-hexane, isooctane, dodecane, and the like, or mixtures thereof, including primarily those paraffins and cycloparaffins having up to about 12 carbon atoms per molecule. Other diluents can be used provided the diluent is nonreactive under the conditions of the olefin reaction.

The amount of water added with the feed to the olefin reaction will ordinarily be between about 0.1 and 100 p.p.m. by volume based on the feed. Particularly beneficial results are obtained with about 0.5 to 5 p.p.m. of water based on the feed. The water can conveniently be added by saturating all or a portion of the feed with water prior to introduction of the feed to the reaction.

Air can be introduced into the feed by dissolving air in the liquid feed; for example, the solubility of air in liquid propylene at 200 p.s.i.g. and 100° F. is about 1 mol percent. Air-saturated propylene and air-free propylene can be blended to provide the desired air content in the propylene feed. The amount of air added to the reaction will be in the range of about 0.5 to 500 p.p.m. by volume based on the feed. The air in the feed will be converted to water in the reaction and thus provide water to reduce the activity of the catalyst.

The following specific embodiments of the invention will be helpful in attaining an understanding of the invention but should not be construed as unduly limiting the invention.

EXAMPLE I

A catalyst comprising about 3 weight percent tungsten oxide associated with silica was utilized in the olefin reaction to disproportionate propylene in a fixed bed reactor at about 450 p.s.i.g., 850° F., and a weight hourly space velocity of 60 (60 parts by weight of feed per part by weight of catalyst per hour). The feed comprised about 60 weight percent propylene and about 40 weight percent propane.

The results of a run at the above conditions are shown in the following Table I:

TABLE I

| Time on stream, hrs.: | Water, p.p.m., wt. | Propylene conversion, wt. percent |
|---|---|---|
| 2.0 | 0 | 47.5 |
| 4.0 | 0 | 48.0 |
| 6.0 | 0 | 47.7 |
| 7.5 | 0 | 47.4 |
| 9.0 | 0 | 47.0 |
| 10.8 | 0 | 46.6 |
| 12.5 | 0 | 46.2 |
| 14.1 | 0 | 45.4 |
| 15.8 | 0 | 44.7 |
| 17.5 | 0 | 44.2 |
| 19.0 | 0 | 43.2 |
| 20.5 | 0 | 42.5 |

The above data show that conversion was above 45 percent for the first 14 hours of the run. It is desired that conversion be maintained at about 44 percent conversion or below so as to maintain a substantially constant feed to the fractionators (distillation system) downstream from the reactors.

EXAMPLE II

Measured amounts of water were added to the feed to the disproportionation of propylene as in Example I by blending water-saturated feed with dry feed and such feed was utilized in the run shown in the following Table II. The water content of the feed stream was also measured by a moisture monitor. The moisture monitor required about 2 hours to reach equilibrium, therefore, the last reading at each moisture level is considered the most accurate reading.

TABLE II

| Time on stream, hrs.: | Water, p.p.m., wt. Calculated | Water, p.p.m., wt. Measured | Propylene conversion, wt. percent |
|---|---|---|---|
| 1 | 90 | 50 | 26.6 |
| 2 | 90 | 69 | 19.7 |
| 3 | 90 | 71 | 19.1 |
| 4 | 90 | 72 | 18.8 |
| 5 | 90 | 74 | 17.0 |
| 6 | 0 | | 43.5 |
| 7 | 0 | 1.1 | 45.6 |
| 8 | 32 | 4.5 | 28.5 |
| 9 | 32 | 9.5 | 25.8 |

The above data show that water added to the feed is very effective in reducing the activity of the catalyst. The above data also show that the effect of the water is temporary and that the catalyst returns to its active and state when the addition of water is terminated. The above data also show that the amount of water introduced reduced the activity of the catalyst more than was desired for the particular problem.

EXAMPLE III

A run was made with about 1 p.p.m. of water in the feed. The results are shown in the following Table III:

TABLE III

| Time on stream hrs.: | Water, p.p.m., wt. Calculated | Water, p.p.m., wt. Measured | Propylene conversion, wt. percent |
|---|---|---|---|
| 2.0 | 0.9 | 2.6 | 44.4 |
| 3.4 | 0.9 | 2.4 | 43.1 |
| 5.0 | 0.9 | 2.1 | 41.6 |
| 6.8 | 0.9 | 1.3 | 43.4 |
| 8.5 | 0.9 | 0.9 | 44.5 |
| 10.0 | 0.9 | 0.9 | 44.3 |
| 12.0 | 0 | 0.4 | 45.0 |

The above data show that about 1 p.p.m. of water reduced the conversion to a satisfactory level. The conditions in Examples II and III were all the same as in Example I except for the water in the feed.

EXAMPLE IV

In an operation wherein propylene is disproportionated to ethylene and butenes in two reactors operated alternately on reaction and regeneration, a propylene stream containing about 95 weight percent propylene is utilized as feed. The reaction pressure is about 450 p.s.i.g., the reaction temperature is about 850° F., and the weight hourly space velocity is about 60. When the activity of the catalyst in the reactor on duty drops to a predetermined level which is considered the minimum economical activity, the reactor is taken out of reaction service and is regenerated by passing a mixture of air and nitrogen or air and carbon dioxide through the catalyst bed to burn off the carbon accumulated on the catalyst. The regeneration pressure is about atmospheric and the temperature is allowed to rise to about 1000–1100° F. After regeneration, the catalyst bed is maintained at a temperature of about 1000° F. for at least about 30 minutes to activate the catalyst by passing nitrogen or carbon dioxide therethrough. The catalyst bed is then cooled to about 700° F. and pressurized to 450 p.s.i.a. before the propylene feed is started through the reactor.

In operating this system according to the process of the present invention, the proplyene feed is blended with water-saturated propylene to form a mixture containing about 1 to 2 p.p.m. water by weight and introduced into a freshly regenerated and activated catalyst-containing reactor as soon as the activation period is completed. Pressurizing is also started so that production is obtained while the catalyst bed is being cooled to the desired reaction temperature. The amount of water is regulated so as to maintain conversion at the desired level. Water addition is terminated when conversion at the desired level can be maintained without the addition of water.

That which is claimed is:

1. In the process of converting at least one reactant selected from the group consisting of cyclic and acyclic mono- and polyene olefin hydrocarbons and mixtures of at least one such olefin hydrocarbon and ethylene in the olefin reaction by contacting with a catalyst, comprising silica and tungsten oxide having an initial period of high activity, under conditions suitable for obtaining a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of said new pairs being connected by an olefinic double bond, within a temperature range of about 600–1100° F. and a pressure range of about 0–1500 p.s.i.g., the improvement comprising the step of adding a material selected from the group consisting of air and water to said olefin reaction in a controlled amount sufficient to reduce the activity of said catalyst to a predetermined level, wherein when air is added the amount is in the range of about 0.5 to 500 p.p.m. and when water is added the amount is in the range of about 0.1 to 100 p.p.m. by volume based on the feed.

2. The process of claim 1 wherein the olefin is an acyclic mono- or polyene having from 3 to 30 carbon atoms per molecule; a cyclic mono- or polyene having from 4 to 20 carbon atoms per molecule; mixtures of said olefins; or mixtures of ethylene and at least one of said olefins.

3. The process of claim 2 wherein the process is disproportionation and the olefin is propylene.

4. The process of claim 3 wherein the additive is water.

5. The process of claim 2 wherein the additive is air.

6. The process of claim 4 wherein the amount of water is in the range of about 0.5 to 5 p.p.m.

7. The process of claim 2 wherein the olefin is an acyclic monoene, a mixture of said olefins or a mixture of at least one said olefin and ethylene.

8. The process of claim 7 wherein the additive is water in an amount in the range of about 0.5 to 5 p.p.m. by volume based on the feed and is controlled to maintain the conversion substantially constant at about 44 percent or below.

References Cited

UNITED STATES PATENTS

| | | | |
|---|---|---|---|
| 2,399,678 | 5/1946 | Houdry et al. | 260—680 |
| 2,902,522 | 9/1959 | Owen | 260—680 |
| 3,261,879 | 7/1966 | Banks | 260—683 |
| 3,365,513 | 1/1968 | Heckelsberg | 260—683 |
| 3,410,920 | 11/1968 | Olsen et al. | 260—680 |

DELBERT E. GANTZ, Primary Examiner

C. E. SPRESSER, Assistant Examiner

U.S. Cl. X.R.

260—666, 668, 680